(12) United States Patent
Chuang et al.

(10) Patent No.: US 8,083,514 B2
(45) Date of Patent: Dec. 27, 2011

(54) UNIFORM-PRESSURE SHAPING APPARATUS AND SYSTEM

(75) Inventors: Yuan-Li Chuang, Taipei County (TW); Ming-Tze Kao, Taipei (TW)

(73) Assignee: Chenming Mold Ind. Corp., Taipei (TW)

( * ) Notice: Subject to any disclaimer, the term of this patent is extended or adjusted under 35 U.S.C. 154(b) by 0 days.

(21) Appl. No.: 12/889,921

(22) Filed: Sep. 24, 2010

(65) Prior Publication Data

US 2011/0287124 A1   Nov. 24, 2011

(30) Foreign Application Priority Data

May 24, 2010   (TW) ................................ 99116572 A

(51) Int. Cl.
*B29C 59/02* (2006.01)
(52) U.S. Cl. ..... 425/384; 425/385; 425/389; 425/405.1; 425/DIG. 19
(58) Field of Classification Search .................. 425/384, 425/385, 389, 405.1, 406, 408, 415, DIG. 19; 100/211
See application file for complete search history.

(56) References Cited

U.S. PATENT DOCUMENTS

| 7,195,734 | B2 * | 3/2007 | Heidari | 425/419 |
| 7,204,686 | B2 * | 4/2007 | Chung et al. | 425/385 |
| 7,388,178 | B2 * | 6/2008 | Hennessey | 425/406 |

* cited by examiner

*Primary Examiner* — Richard Crispino
*Assistant Examiner* — Thukhanh Nguyen
(74) *Attorney, Agent, or Firm* — WPAT, P.C.; Anthony King

(57) ABSTRACT

In a uniform-pressure shaping apparatus and system, the system comprises a uniform-pressure shaping apparatus, a vacuum unit and a fluid circulation unit, and the apparatus comprises a first cavity and a second cavity, each including a sealed pressure chamber, a heat conduction film and a template. An object to be imprinted is put on a pattern-imprinting surface of the template. When the first and second cavities get close to each other, the vacuum unit vacuums the space between the pattern-imprinting surfaces of the two templates. Meanwhile, the fluid circulation unit drives a hot fluid to pass through the two sealed pressure chambers. With the iso-pressure characteristic of the hot fluid, the object to be imprinted is heated and pressed uniformly until a desired shape is formed, and then a cold fluid is driven to pass through the two sealed pressure chambers to cool the object to be imprinted.

7 Claims, 3 Drawing Sheets

UNIFORM-PRESSURE SHAPING APPARATUS AND SYSTEM

BACKGROUND OF THE INVENTION

1. Field of the Invention

The present invention relates to a uniform-pressure shaping apparatus and system, and more particularly to a shaping apparatus and system using a fluid to apply pressure uniformly.

2. Description of the Related Art

In a conventional hot-press forming, an object to be imprinted is placed in a mold cavity of an imprint mold, and the imprint mold includes a set of upper and lower templates, and each of the upper and lower templates has an pattern-imprinting surface with an imprint pattern, and the object to be imprinted is placed between surfaces having the imprint patterns on the upper and lower templates, and then the imprint mold is closed. Now, the upper and lower templates will form a sealed mold cavity, and the object to be imprinted is situated in the sealed mold cavity. After the imprint mold is closed, the imprint mold is heated to soften the object to be imprinted to a plastic state, and then the imprint mold presses at the object to be imprinted, such that the imprint patterns of the upper and lower templates are formed on the object to be imprinted, and finally the object to be imprinted is cooled, and the shaped product is removed from the imprint mold after the imprint mold is opened.

The conventional pressing device uses hydraulic, pneumatic or other drivers as a source of an output pressure and operates together with a camshaft or a shaft connected directly to the imprint mold to apply pressure to the template. Compared with the shaft for transmitting pressure, the template has a plane of a large area, and the pressure of the template transmitted by the shaft is considered as a point pressure, so that the whole plane of the template may not be pressed easily. As a result, the object to be imprinted is pressed by the template with a non-uniform pressure, and it is difficult to improve the yield rate of the imprint product, and only imprint products with a small size can be manufactured. Small improvements were made afterwards. For example, a multi-axis pressure device using a silicone board as a shock absorbent was introduced.

In general, the conventional heating device includes a borehole formed on the upper and lower templates or the imprint mold to form a water path, and heats or cools the object to be imprinted by a hot fluid or a cold fluid; or both heat pipe and water path are installed in staggered relation, wherein the heat pipe is used for heating the object to be imprinted, and the water path is provided for passing the cold fluid to cool the object to be imprinted. In the aforementioned conventional heating method, the imprint mold body is heated first, and then the heat energy is conducted to the object to be imprinted. The heat conduction may have a non-constant speed due to factors such as the size of the imprint mold, the installation position of the heat pipe or water path, and the size of the object to be imprinted, and thus the object to be imprinted may be softened and non-uniform, and a low yield rate of the imprint product may result.

SUMMARY OF THE INVENTION

In view of the shortcomings of the prior art, it is a primary objective of the invention to provide a uniform-pressure shaping apparatus, which overcomes the problem of low yield rate and also overcomes the non-uniform pressing and non-uniform heating problems of an object to be imprinted.

To achieve the foregoing objective, the present invention provides a uniform-pressure shaping apparatus, comprising a first cavity, a first heat conduction film, and a first template. The first cavity is disposed on a side of a molding machine, and the first cavity is a cavity with a first open surface, and a first fluid inlet and a first fluid outlet formed at the periphery of the cavity. The first heat conduction film is disposed on the first open surface for sealing the first cavity to form a first sealed pressure chamber, wherein a surface of the first heat conduction film with its backside aligning towards the first sealed pressure chamber is coupled to a surface of the first template, and another surface of the first template is a first pattern-imprinting surface. The molding machine is provided for driving the first cavity, and a cold fluid or a hot fluid is passed to the first sealed pressure chamber through the first fluid inlet and the first fluid outlet. The uniform-pressure shaping apparatus further comprises a second cavity, a second heat conduction film, and a second template. The second cavity is disposed on another side of the molding machine, wherein the second cavity is a cavity with a second open surface, and a second fluid inlet and a second fluid outlet are formed at the periphery of the cavity. The second heat conduction film is installed at a second open surface of the second cavity to seal the second cavity to form a second sealed pressure chamber. A surface of the second template is disposed on the second heat conduction film with its backside aligning towards the second sealed pressure chamber, and another surface is a second pattern-imprinting surface provided for placing an object to be imprinted thereon. If the first cavity and the second cavity are closed, a containing space is formed between the first pattern-imprinting surface and the second pattern-imprinting surface, and the object to be imprinted is situated in the containing space. A cold fluid or a hot fluid is passed through the second fluid inlet and the second fluid outlet into the second sealed pressure chamber. The uniform-pressure shaping apparatus further comprises a vacuum pipeline, with an end connected to the containing space, and another end connected to a vacuum unit, and the vacuum unit draws air from the containing space through the vacuum pipeline. The cold fluid or hot fluid is transmitted to the first sealed pressure chamber and the second sealed pressure chamber by a fluid circulation unit, and the hot fluid is used for heating and pressing the object to be imprinted, and the cold fluid is used for cooling the object to be imprinted.

To achieve the foregoing objective, the present invention provides a uniform-pressure shaping system to overcome the problems of a non-uniform pressing and heating process of an object to be imprinted and a low yield rate.

The uniform-pressure shaping system comprises a uniform-pressure shaping apparatus, a vacuum unit and a fluid circulation unit. The uniform-pressure shaping apparatus comprises at least one cavity, a first template and a second template. A surface of the cavity is disposed on a side of a molding machine, and a heat conduction film is installed on another surface of the cavity, and the cavity is sealed by a heat conduction film to form a sealed pressure chamber. A surface of the first template is disposed on heat conduction film with its backside aligning towards the sealed pressure chamber, and another surface of the first template is a first pattern-imprinting surface with an imprint pattern. A surface of the second template is disposed on another side of the molding machine, and another surface of the second template is a second pattern-imprinting surface, and an object to be imprinted is placed on the second pattern-imprinting surface. The vacuum unit is connected to a containing space through a vacuum pipeline for drawing out air from the containing space to define a vacuum state. The containing space is a gap formed between the first pattern-imprinting surface and the second pattern-imprinting surface when the molding machine is closed, and the object to be imprinted is situated in the containing space. The fluid circulation unit includes a first pipeline, a second pipeline, a third pipeline, a fourth pipeline, a hot fluid storage tank and a cold fluid storage tank. An end of the first pipeline is coupled to a fluid inlet, and another end of the first pipeline is coupled to a hot fluid storage tank, and includes a first pressure valve and a first driver. The first driver is provided for driving a hot fluid contained in the hot fluid storage tank to enter into the sealed pressure chamber through the fluid inlet to heat the object to be imprinted. An end of the second pipeline is coupled to the fluid inlet, and another end of the second pipeline is coupled to a cold fluid storage tank, and includes a second pressure valve and a second driver. The second driver is provided for driving a cold fluid contained in the cold fluid storage tank to enter into the sealed pressure chamber through the fluid inlet to cool the object to be imprinted. An end of the third pipeline is coupled to a fluid outlet, and another end of the third pipeline is coupled to a cold fluid storage tank, and includes a third pressure valve and a third driver. The third driver is provided for driving the cold fluid or hot fluid in the sealed pressure chamber to exit from sealed pressure chamber to the cold fluid storage tank. An end of the fourth pipeline is coupled to the fluid outlet through a fourth pressure valve, and another end of the fourth pipeline is coupled to the hot fluid storage tank for providing a passage to flow the hot fluid to the hot fluid storage tank. If the first driver is operated and only the first pipeline, the sealed pressure chamber and the fourth pipeline are interconnected, the hot fluid will flow through the sealed pressure chamber, and the heat conduction film and the template will heat the object to be imprinted. If the first driver is operated and only the first pipeline and the sealed pressure chamber are interconnected, the hot fluid will flow into the sealed pressure chamber to accumulate pressure and produce a uniform pressure to be exerted onto the object to be imprinted through the heat conduction film. If the third driver is operated and only the third pipeline and the sealed pressure chamber are interconnected, the hot fluid will flow out from the sealed pressure chamber to release pressure. If the second driver is operated and only the second pipeline, the sealed pressure chamber and the third pipeline are interconnected, the cold fluid will flow through the sealed pressure chamber, and the heat conduction film and the template will cool the object to be imprinted.

The first pipeline further comprises a heater installed between the first pressure valve and the first driver for re-heating or maintaining the temperature of the hot fluid passing through the first pipeline.

The second pipeline further comprises a heat exchanger installed between the second pressure valve and the second driver for re-cooling or maintaining the temperature of the cold fluid passing through the second pipeline.

The hot fluid storage tank further includes a heating coil pipe installed therein for heating and storing a fluid in the hot fluid storage tank.

The cold fluid storage tank further includes a cooling coil pipe installed therein for cooling and storing a fluid in the cold fluid storage tank.

The uniform-pressure shaping apparatus further comprises a second cavity disposed on another side of the molding machine, and a second fluid inlet and a second fluid outlet formed at the periphery of the second cavity, wherein the second fluid inlet and the second fluid outlet are interconnected through a second sealed pressure chamber which is formed by dividing the second cavity through a second heat conduction film. A surface of the second template is disposed on a surface of the second heat conduction film with its backside aligning towards the second sealed pressure chamber.

In summation, the uniform-pressure shaping apparatus and system of the present invention have one or more of the following advantages:

(1) The uniform-pressure shaping apparatus and system use a hot fluid as a heat source, and the heat conduction film acting as a medium is very thin, so that heat can be conducted to heat the object to be imprinted uniformly.

(2) The uniform-pressure shaping apparatus and system use a high-pressure fluid as a pressure source, so that the object to be imprinted is pressed uniformly by the distribution of equal forces of fluid molecules.

(3) The uniform-pressure shaping apparatus and system use a high-pressure fluid as a pressure source, so that the size of the object to be imprinted is not limited due to the distribution of equal forces of fluid molecules.

DETAILED DESCRIPTION OF THE PREFERRED EMBODIMENTS

Figure 1:
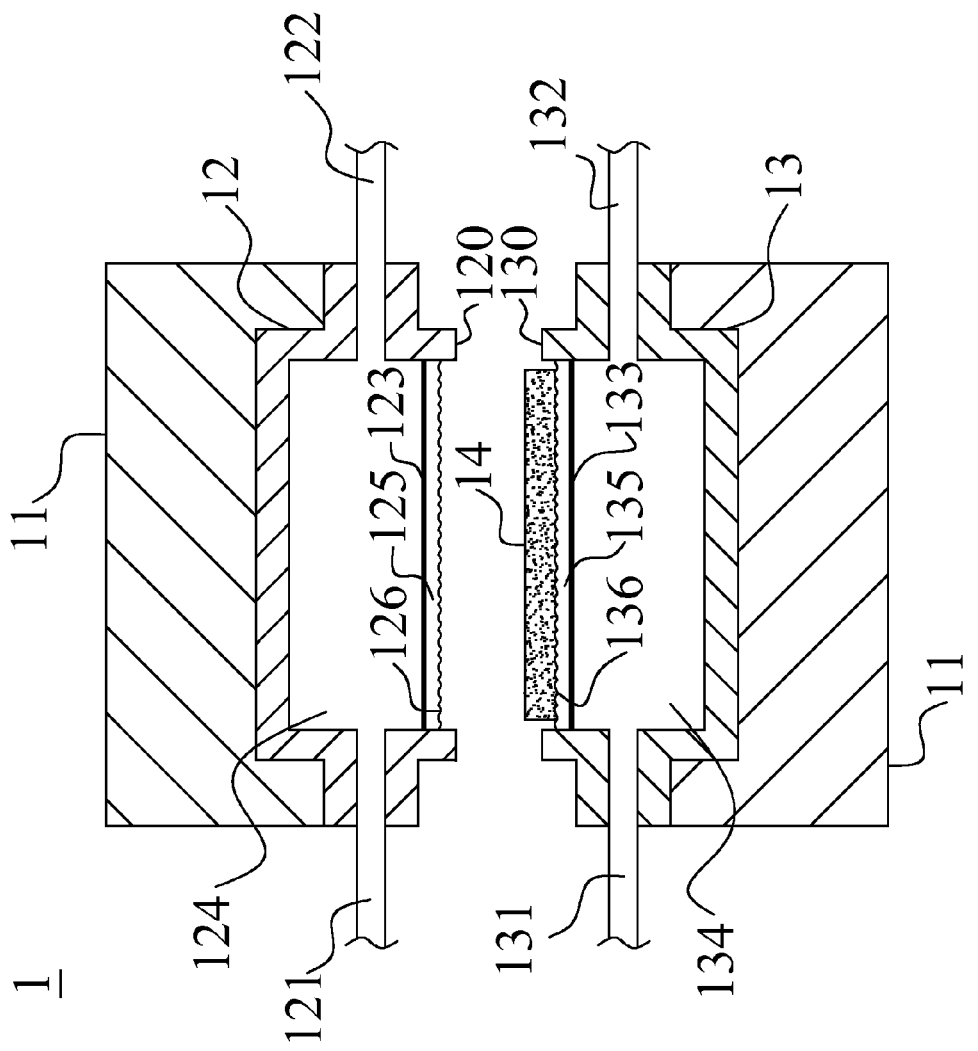
FIG. 1 is a schematic view of a uniform-pressure shaping apparatus in accordance with the present invention.
Figure 2:
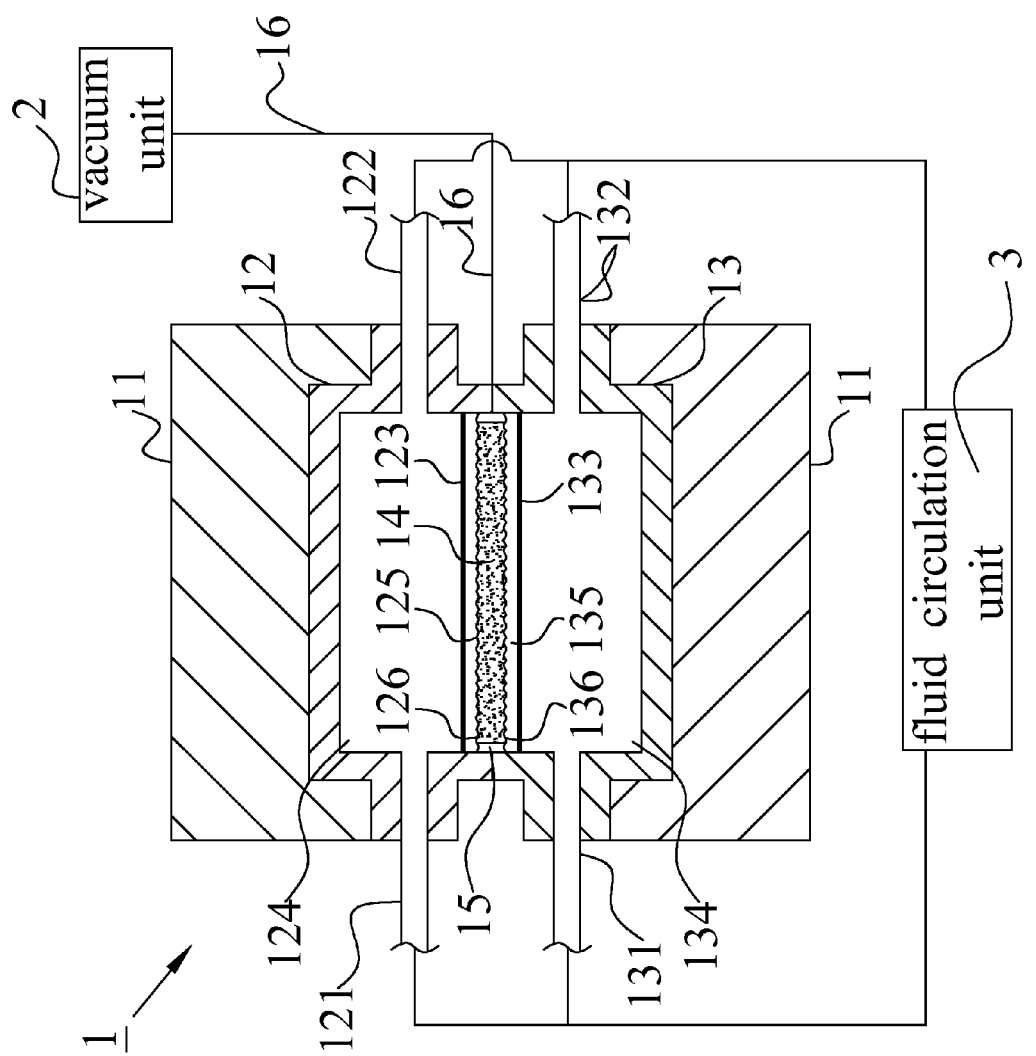
FIG. 2 is a schematic view of opening and closing a uniform-pressure shaping apparatus in accordance with the present invention.

With reference to FIGS. 1 and 2 for a schematic view of a uniform-pressure shaping apparatus and a schematic view of opening and closing the uniform-pressure shaping apparatus in accordance with the present invention respectively, the uniform-pressure shaping apparatus comprises a first cavity 12 and a second cavity 13, wherein the first cavity 12 is disposed on a side of the molding machine 11, and the second cavity 13 is disposed on another side of the molding machine 11. The first cavity 12 is a cavity having a first open surface 120, and the first cavity 12 includes a first fluid inlet 121 and a first fluid outlet 122 formed at the periphery of the first cavity 12. The first heat conduction film 123 is installed at the first open surface 120 to seal the first cavity 12 to form a first sealed pressure chamber 124. A surface of the first template 125 is disposed on the first heat conduction film 123 with its backside aligning towards the first sealed pressure chamber 124, and another surface of the first template 125 is a first pattern-imprinting surface 126. The second cavity 13 is a cavity having a second open surface 130, and the second cavity 13 includes a second fluid inlet 131 and a second fluid outlet 132 formed at the periphery of the second cavity 13. The second heat conduction film 133 is installed at the second open surface 130 to seal the second cavity 13 to form a second sealed pressure chamber 134. A surface of the second template 135 is disposed on the second heat conduction film 133 with its backside aligning towards the second sealed pressure chamber 134, and another surface of the second template 135 is a second pattern-imprinting surface 136, and an object to be imprinted 14 is placed on the second pattern-imprinting surface 136. When the first cavity 12 and the second cavity 13 are closed, a containing space 15 is formed between the first pattern-imprinting surface 126 and the second pattern-imprinting surface 136, and the object to be imprinted 14 placed on the second pattern-imprinting surface 136 is situated in the containing space 15. An end of the vacuum pipeline 16 is coupled to the containing space 15, and another end of the vacuum pipeline 16 is coupled to a vacuum unit 2, and the vacuum unit 2 is provided for drawing air from the containing space 15 to define a vacuum state. The fluid circulation unit 3 transmits a hot fluid or a cold fluid to the first sealed pressure chamber 124 and the second sealed pressure chamber 134. The hot fluid is used for heating and pressing the object to be imprinted 14, and the cold fluid is used for cooling the object to be imprinted 14.

Figure 3:
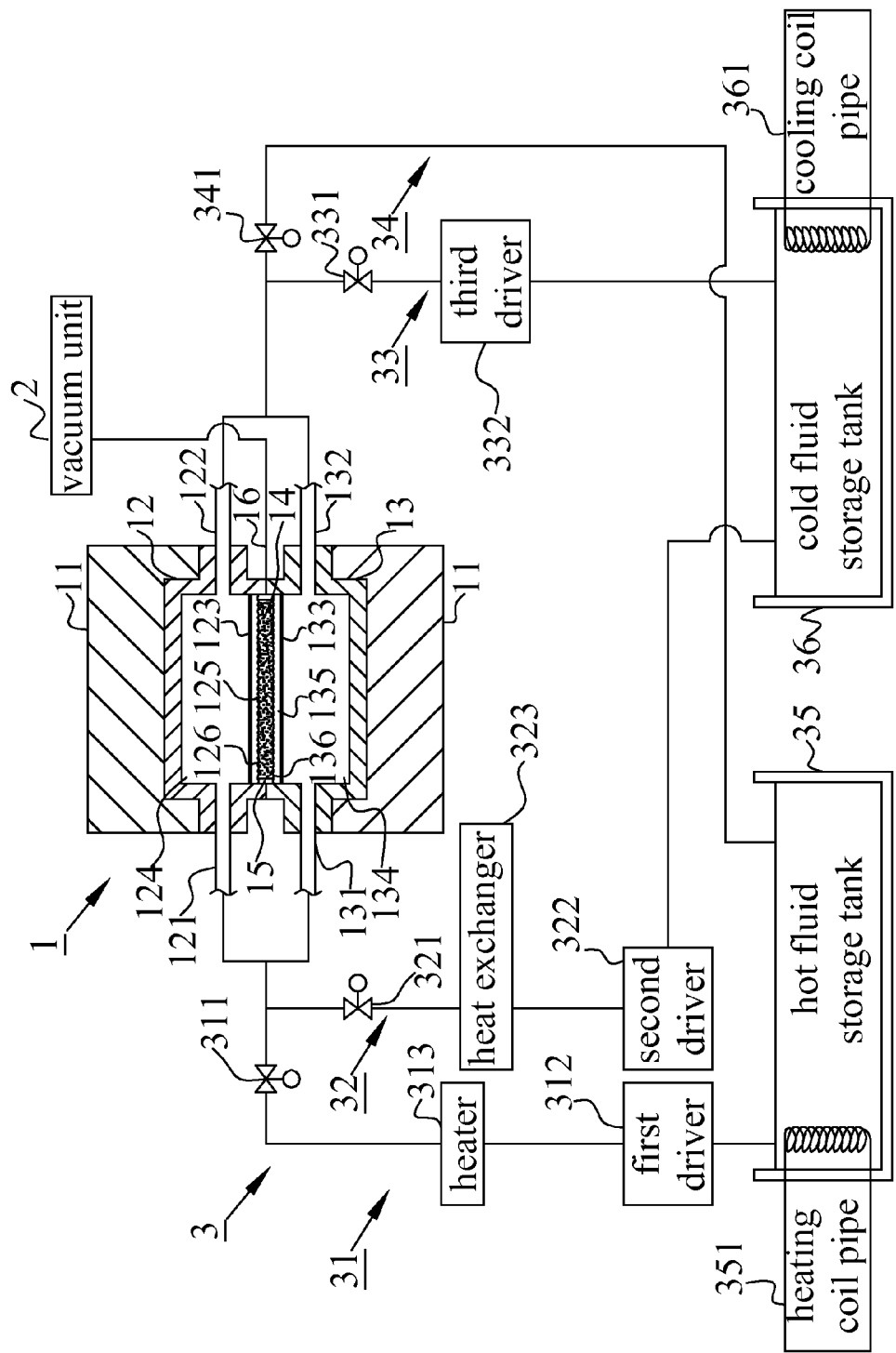
FIG. 3 is a schematic view of a uniform-pressure shaping system in accordance with the present invention.

With reference to FIG. 3 for a schematic view of a uniform-pressure shaping system in accordance with a preferred embodiment of the present invention, the uniform-pressure shaping apparatus 1 is a device having two sealed pressure cavities, but the invention is not limited to such arrangement only. The uniform-pressure apparatus 1 comprises a first cavity 12 and a second cavity 13, wherein an opening formed on a surface of the first cavity is sealed by a first heat conduction film 123 to form a first sealed pressure chamber 124, and another surface of the first cavity is disposed on a side of a molding machine 11, and the first cavity 12 includes a first fluid inlet 121 and a first fluid outlet 122 formed at the periphery of the first cavity 12, and the first fluid inlet 121 and the first fluid outlet 122 are interconnected through the first sealed pressure chamber 124. An opening formed on a surface of the second cavity 12 is sealed by a second heat conduction film 133 to form a second sealed pressure chamber 134, and another surface of the second cavity 12 is disposed on another side of the molding machine 11, and a second fluid inlet 131 and a second fluid outlet 132 are formed at the periphery of the second cavity 13, and the second fluid inlet 131 and the second fluid outlet 132 are interconnected through the second sealed pressure chamber 134. A first template 125 includes a first pattern-imprinting surface 126, and a surface with its backside aligning towards the first pattern-imprinting surface 126 is disposed on the first heat conduction film 123 with its backside aligning towards the first sealed pressure chamber 124. A second template 135 has a second pattern-imprinting surface 136, and a surface with its backside aligning the second pattern-imprinting surface 136 is disposed on the second heat conduction film 133 with its backside aligning towards the second sealed pressure chamber 134, and an object to be imprinted 14 is placed on the second pattern-imprinting surface 136. When the molding machine 11 is closed, a containing space 15 is formed between the first pattern-imprinting surface 126 and the second pattern-imprinting surface 136, and the object to be imprinted 14 is situated in the containing space 15. A fluid circulation unit 3 comprises a hot fluid storage tank 35, a cold fluid storage tank 36, a first pipeline 31, a second pipeline 32, a third pipeline 33 and a fourth pipeline 34. The hot fluid storage tank 35 is connected to the uniform-pressure shaping apparatus 1 through the first pipeline 31 and the fourth pipeline 34 for providing a hot fluid to heat and press the templates 125, 135 and the object to be imprinted 14, and the cold fluid storage tank 36 is connected to the uniform-pressure shaping apparatus 1 through the second pipeline 32 and the third pipeline 33 for providing a cold fluid to cool the templates 125, 135 and the object to be imprinted 14. The hot fluid storage tank 35 includes a heating coil pipe 351 for heating a fluid contained in the hot fluid storage tank 35, and the cold fluid storage tank 36 includes a cooling coil pipe 361 for cooling a fluid contained in the cold fluid storage tank 36. Ends of the first pipeline 31 and the fourth pipeline 34 are connected to the sealed pressure chambers 124, 134 through the fluid inlets 121, 131 and the fluid outlets 122, 132 respectively, and other ends of the first pipeline 31 and the fourth pipeline 34 are connected to the hot fluid storage tank 35. The first pipeline 31 comprises a first pressure valve 311 installed at a position proximate to the fluid inlets 121, 131 and a first driver 312 for driving the hot fluid contained in the hot fluid storage tank 35 to enter into the sealed pressure chambers 124, 134. The fourth pipeline 34 includes a fourth pressure valve 341 installed at a position proximate to the fluid outlets 122, 132. Ends of the second pipeline 32 and the third pipeline 33 are connected to the sealed pressure chamber 124, 134 through the fluid inlets 121, 131 and the fluid outlets 122, 132 respectively, and other ends of the second pipeline 32 and the third pipeline 33 are connected to the cold fluid storage tank 36. The second pipeline 32 comprises a second pressure valve 321 installed at a position proximate to the fluid inlets 121, 131 and a second driver 322 for driving a cold fluid contained in the cold fluid storage tank 36 to enter into the sealed pressure chambers 124, 134. The third pipeline 33 comprises a third pressure valve 331 installed at a position proximate to the fluid outlets 122, 132 and a third driver 332 for driving a hot fluid contained in the sealed pressure chambers 124, 134 to flow from the sealed pressure chambers 124, 134 to the cold fluid storage tank 36.

When the molding machine 11 is closed, the vacuum unit 2 is operated to vacuum the containing space 15, while the first pipeline 31 and the fourth pipeline 34 remain interconnected with the sealed pressure chamber 124, 134, and the second pipeline and the third pipeline remain closed, and the first driver 312 is operated to transmit a hot fluid contained in the hot fluid storage tank 35 to enter into the sealed pressure chambers 124, 134 to perform a heating process. If the heat conduction films 123, 133 and the templates 125, 135 are heated by the hot fluid, the heat will be transmitted to the object to be imprinted 14 uniformly to achieve the uniform temperature effect. After the object to be imprinted 14 is heated to a plastic state, the fourth pipeline is shut down or the fourth pressure valve 341 is turned off, and the first driver 312 continues driving the hot fluid into the sealed pressure chamber 124, 134 for accumulating pressure. When the pressure in the cavities has reached a desired level, the first pipeline is shut down, namely the first pressure valve 311 is turned off, to maintain the desired level of pressure. With the uniform pressure characteristic of the fluid, pressure can be transmitted uniformly to the object to be imprinted 14 through the heat conduction films 123, 133 and the templates 125, 135 to achieve the uniform pressure effect. If the object to be imprinted 14 is heated, pressed, transprinted, and shaped, then the third pipeline will be opened, namely the third pressure valve 331 will be turned on, to release the pressure. Meanwhile, the third driver 332 is operated to draw out the hot fluid contained in the sealed pressure chamber 124, 134 from the fluid outlet 122, 132 to the cold fluid storage tank 36. After the hot fluid is cooled by the cooling coil pipe 361, the fluid can be reused. If the hot fluid contained in the sealed pressure chamber 124, 134 is almost exhausted, the second pipeline 32 will be opened, namely the second pressure valve 321 will be turned on. Meanwhile, the second driver 322 is operated to drive the cold fluid contained in the cold fluid storage tank 36 to enter into the sealed pressure chambers 124, 134 to perform the cooling process. After the object to be imprinted 14 is cooled, transprinted and shaped, the molding machine 11 is opened to remove the object to be imprinted 14.

A heater 313 can be installed between the first driver 312 and the first pressure valve 311 to expedite heating the hot fluid or adjusting the temperature of the hot fluid. A heat exchanger 323 can be installed between the second driver 322 and the second pressure valve 321 to expedite cooling the cold fluid or adjusting the temperature of the cold fluid.

In summation of the description above, the present invention improves over the prior art and complies with the patent application requirements, and thus the invention is duly filed for patent application. While the invention has been described by means of specific embodiments, numerous modifications and variations could be made thereto by those generally skilled in the art without departing from the scope and spirit of the invention set forth in the claims.

What is claimed is:

1. A uniform-pressure shaping apparatus, comprising:
   a first cavity, being a cavity having a first open surface, a first fluid inlet and a first fluid outlet formed at the periphery of the first cavity, and the first cavity being installed on a side of a molding machine, and the molding machine being used for driving the first cavity;
   a first heat conduction film, installed at the first open surface to seal the first cavity to form a first sealed pressure chamber, and a cold fluid or a hot fluid flowing through the first fluid inlet and the first fluid outlet to the first sealed pressure chamber;
   a first template, having one surface disposed on the first heat conduction film with its backside aligning towards the first sealed pressure chamber, and another surface of the first template being a first pattern-imprinting surface;
   a second cavity, being a cavity having a second open surface, a second fluid inlet and a second fluid outlet formed at the periphery of the second cavity, and the second cavity being installed on another side of the molding machine;
   a second heat conduction film, installed at the second open surface to seal the second cavity to form a second sealed pressure chamber, and the cold fluid or the hot fluid flowing through the second fluid inlet and the second fluid outlet to the second sealed pressure chamber;
   a second template, having one surface disposed on the second heat conduction film with its backside aligning towards the second sealed pressure chamber, and another surface of the second template being a second pattern-imprinting surface, and an object to be imprinted being disposed on the second pattern-imprinting surface, such that if the first cavity and the second cavity are closed, a containing space is formed between the first pattern-imprinting surface and the second pattern-imprinting surface, and the object to be imprinted is situated in the containing space; and
   a vacuum pipeline, with an end coupled to the containing space, and another end coupled to a vacuum unit, and the vacuum unit drawing air from the containing space through the vacuum pipeline;
   wherein a fluid circulation unit is provided for transmitting the hot fluid or the cold fluid to the first sealed pressure chamber and the second sealed pressure chamber, and the hot fluid is used for heating the object to be imprinted to a plastic state, and the cold fluid is used for cooling the object to be imprinted, and the fluid circulation unit produces a uniform pressure at the first sealed pressure chamber and the second sealed pressure chamber by the hot fluid.

2. A uniform-pressure shaping system, comprising:
   a uniform-pressure shaping apparatus, including at least one cavity, and the cavity including a surface with an opening sealed by a heat conduction film to form a sealed pressure chamber, and another surface of the cavity being disposed on a side of a molding machine, and a fluid inlet and a fluid outlet being formed at the periphery of the cavity, and the fluid inlet being interconnected to the fluid outlet through the sealed pressure chamber, and a surface of a first template being disposed on the heat conduction film with its backside aligning towards the sealed pressure chamber, and another surface of the first template being a first pattern-imprinting surface, and a surface of a second template being disposed on another side of the molding machine, and another surface of the second template being a second pattern-imprinting surface, and an object to be imprinted being disposed on the second pattern-imprinting surface; and
   a vacuum unit, coupled to a containing space through a vacuum pipeline, and the containing space being a space formed between the first pattern-imprinting surface and the second pattern-imprinting surface when the first template and the second template are closed, and the vacuum unit being used for drawing air from the containing space, and the object to be imprinted being situated in the containing space; and
   a fluid circulation unit, coupled to the uniform-pressure shaping apparatus, and comprising:
   a first pipeline, with an end coupled to the sealed pressure chamber through a first pressure valve and the fluid inlet, and another end coupled to a hot fluid storage tank through a first driver, and the first driver being used for driving a hot fluid to enter into the sealed pressure chamber to heat the object to be imprinted;
   a second pipeline, with an end coupled to the sealed pressure chamber through a second pressure valve and the fluid inlet, and another end coupled to a cold fluid storage tank through a second driver, and the second driver being used for driving a cold fluid to enter into the sealed pressure chamber to cool the object to be imprinted;
   a third pipeline, with an end coupled to the sealed pressure chamber through a third pressure valve and the fluid outlet, and another end coupled to the cold fluid storage tank through a third driver, and the third driver being used for driving a cold fluid or a hot fluid in the sealed pressure chamber to exit from the sealed pressure chamber to the cold fluid storage tank; and
   a fourth pipeline, with an end coupled to the sealed pressure chamber through a fourth pressure valve and the fluid outlet, and another end coupled to the hot fluid storage tank for providing a passage to discharge the hot fluid from the sealed pressure chamber to the hot fluid storage tank;
   wherein if only the first pipeline is interconnected to the fourth pipeline through the sealed pressure chamber and the first driver is operated, the object to be imprinted will be at a heating state;
   wherein if only the first pipeline is interconnected to the sealed pressure chamber and the first driver is operated, the sealed pressure chamber will be at a pressure accumulation state;
   wherein if only the third pipeline is interconnected to the sealed pressure chamber and the third driver is operated, the sealed pressure chamber will be at a pressure release state; and
   wherein if only the second pipeline is interconnected to the third pipeline through the sealed pressure chamber and the second driver is operated, the sealed pressure chamber will be at a state of cooling the object to be imprinted.

3. The uniform-pressure shaping system of claim 2, wherein the first pipeline further comprises a heater installed between the first pressure valve and the first driver for heating or maintaining the temperature of the hot fluid flowing in the first pipeline.

4. The uniform-pressure shaping system of claim 2, wherein the second pipeline further comprises a heat exchanger installed between the second pressure valve and the second driver for cooling or maintaining the temperature of the cold fluid flowing in the second pipeline.

5. The uniform-pressure shaping system of claim 2, wherein the hot fluid storage tank further comprises a heating coil pipe installed in the hot fluid storage tank for heating a fluid in the hot fluid storage tank.

6. The uniform-pressure shaping system of claim 2, wherein the cold fluid storage tank further comprises a cooling coil pipe installed in the cold fluid storage tank for cooling a fluid in the cold fluid storage tank.

7. The uniform-pressure shaping system of claim 2, wherein the uniform-pressure shaping apparatus further comprises a second cavity installed on another side of the molding machine, and the second cavity includes a second open surface, a second heat conduction film installed at the second open surface to seal the second cavity to form a second sealed pressure chamber, and a second fluid inlet and a second fluid outlet are formed at the periphery of the second cavity, and the second fluid inlet is interconnected to the second fluid outlet through the second sealed pressure chamber, and one surface of the second template is disposed on the second heat conduction film with its backside aligning towards the second sealed pressure chamber.

* * * * *